US011800050B2

(12) United States Patent
VanVuuren et al.

(10) Patent No.: US 11,800,050 B2
(45) Date of Patent: Oct. 24, 2023

(54) FULL DISPLAY MIRROR WITH ON-DEMAND SPOTTER VIEW

(71) Applicant: Gentex Corporation, Zeeland, MI (US)

(72) Inventors: Mark A VanVuuren, Dorr, MI (US); Leah R. Hoffmeyer, Holland, MI (US); Ethan J. Lee, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/929,910

(22) Filed: Sep. 6, 2022

(65) Prior Publication Data

US 2022/0417452 A1  Dec. 29, 2022

Related U.S. Application Data

(63) Continuation of application No. 15/855,028, filed on Dec. 27, 2017, now abandoned.
(Continued)

(51) Int. Cl.
  *H04N 5/272* (2006.01)
  *B60K 35/00* (2006.01)
  (Continued)

(52) U.S. Cl.
  CPC ............. *H04N 5/272* (2013.01); *B60K 35/00* (2013.01); *B60R 1/00* (2013.01); *H04N 5/265* (2013.01);
  (Continued)

(58) Field of Classification Search
  CPC ........ H04N 5/272; H04N 5/265; H04N 7/181; B60K 35/00; B60K 2370/15;
  (Continued)

(56) References Cited

U.S. PATENT DOCUMENTS 2,131,888 A  10/1938  Harris
2,632,040 A  3/1953  Rabinow
(Continued)

FOREIGN PATENT DOCUMENTS

EP  0513476  11/1992
EP  0830267 B1  12/2001
(Continued)

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.
(Continued)

*Primary Examiner* — Nasim N Nirjhar
(74) *Attorney, Agent, or Firm* — Price Heneveld LLP; Brian James Brewer

(57) ABSTRACT

A rearview display system is provided for a vehicle having: a rear camera generating a rearward video stream, a right-side camera generating a right-side stream, and a left-side camera generating a left-side stream. The system includes a processing circuit for generating a composite video stream from: (a) the rearward stream and the right-side stream, (b) the rearward stream and the left-side stream, and (c) at least the rearward stream. When the composite stream is formed from the rearward stream and the right-side stream, the rearward stream extends across the whole composite stream with the exception of a right corner where the right-side stream is superimposed over the rearward stream. When the composite stream is formed from the rearward stream and the left-side stream, the rearward stream extends across the whole composite stream with the exception of a left corner where the left-side stream is superimposed over the rearward stream.

18 Claims, 4 Drawing Sheets

Related U.S. Application Data

(60) Provisional application No. 62/440,918, filed on Dec. 30, 2016.

(51) Int. Cl.
*B60R 1/00* (2022.01)
*H04N 5/265* (2006.01)
*H04N 7/18* (2006.01)

(52) U.S. Cl.
CPC ......... *H04N 7/181* (2013.01); *B60K 2370/15* (2019.05); *B60K 2370/21* (2019.05); *B60K 2370/52* (2019.05); *B60R 2300/105* (2013.01); *B60R 2300/303* (2013.01); *B60R 2300/70* (2013.01); *B60R 2300/8026* (2013.01); *B60R 2300/8066* (2013.01)

(58) Field of Classification Search
CPC .. B60K 2370/21; B60K 2370/52; B60R 1/00; B60R 2300/105; B60R 2300/303; B60R 2300/70; B60R 2300/8026; B60R 2300/8066; B60R 1/12
See application file for complete search history.

(56) References Cited

U.S. PATENT DOCUMENTS

| | | |
|---|---|---|
| 2,827,594 A | 3/1958 | Rabinow |
| 3,116,929 A | 1/1964 | Higgins-Luthman |
| 3,162,518 A | 12/1964 | Schofield |
| 3,179,845 A | 4/1965 | Kulwiec |
| 3,581,276 A | 5/1971 | Newman |
| 3,663,819 A | 5/1972 | Hicks et al. |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| 4,599,544 A | 7/1986 | Martin |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,289,321 A | 2/1994 | Secor |
| 5,296,924 A | 3/1994 | Blancard et al. |
| 5,304,980 A | 4/1994 | Maekawa |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Windmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,680,123 A | 10/1997 | Lee |
| 5,684,473 A | 11/1997 | Hibino et al. |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |

(56) References Cited

U.S. PATENT DOCUMENTS

| | | | |
|---|---|---|---|
| 5,767,793 | A | 6/1998 | Agravante et al. |
| 5,781,105 | A | 7/1998 | Bitar et al. |
| 5,786,787 | A | 7/1998 | Eriksson et al. |
| 5,793,308 | A | 8/1998 | Rosinski et al. |
| 5,793,420 | A | 8/1998 | Schmidt |
| 5,796,094 | A | 8/1998 | Schofield et al. |
| 5,798,727 | A | 8/1998 | Shirai et al. |
| 5,811,888 | A | 9/1998 | Hsieh |
| 5,812,321 | A | 9/1998 | Schierbeek et al. |
| 5,837,994 | A | 11/1998 | Stam et al. |
| 5,841,126 | A | 11/1998 | Fossum et al. |
| 5,844,505 | A | 12/1998 | Van Ryzin |
| 5,845,000 | A | 12/1998 | Breed et al. |
| 5,850,176 | A | 12/1998 | Kinoshita et al. |
| 5,867,214 | A | 2/1999 | Anderson et al. |
| 5,877,897 | A | 3/1999 | Schofield et al. |
| 5,883,739 | A | 3/1999 | Ashihara et al. |
| 5,904,729 | A | 5/1999 | Ruzicka |
| 5,905,457 | A | 5/1999 | Rashid |
| 5,912,534 | A | 6/1999 | Benedict |
| 5,923,027 | A | 7/1999 | Stam et al. |
| 5,935,613 | A | 8/1999 | Benham et al. |
| 5,940,011 | A | 8/1999 | Agravante et al. |
| 5,942,853 | A | 8/1999 | Piscart |
| 5,949,331 | A | 9/1999 | Schofield et al. |
| 5,956,079 | A | 9/1999 | Ridgley |
| 5,956,181 | A | 9/1999 | Lin |
| 5,959,555 | A | 9/1999 | Furuta |
| 5,990,469 | A | 11/1999 | Bechtel et al. |
| 6,008,486 | A | 12/1999 | Stam et al. |
| 6,009,359 | A | 12/1999 | El-Hakim et al. |
| 6,018,308 | A | 1/2000 | Shirai |
| 6,025,872 | A | 2/2000 | Ozaki et al. |
| 6,046,766 | A | 4/2000 | Sakata |
| 6,049,171 | A | 4/2000 | Stam et al. |
| 6,060,989 | A | 5/2000 | Gehlot |
| 6,061,002 | A | 5/2000 | Weber et al. |
| 6,067,111 | A | 5/2000 | Hahn et al. |
| 6,072,391 | A | 6/2000 | Suzuki et al. |
| 6,078,355 | A | 6/2000 | Zengel |
| 6,097,023 | A | 8/2000 | Schofield et al. |
| 6,102,546 | A | 8/2000 | Carter |
| 6,106,121 | A | 8/2000 | Buckley et al. |
| 6,111,498 | A | 8/2000 | Jobes et al. |
| 6,115,651 | A | 9/2000 | Cruz |
| 6,122,597 | A | 9/2000 | Saneyoshi et al. |
| 6,128,576 | A | 10/2000 | Nishimoto et al. |
| 6,130,421 | A | 10/2000 | Bechtel et al. |
| 6,130,448 | A | 10/2000 | Bauer et al. |
| 6,140,933 | A | 10/2000 | Bugno et al. |
| 6,144,158 | A | 11/2000 | Beam |
| 6,151,065 | A | 11/2000 | Steed et al. |
| 6,151,539 | A | 11/2000 | Bergholz et al. |
| 6,154,149 | A | 11/2000 | Tyckowski et al. |
| 6,157,294 | A | 12/2000 | Urai et al. |
| 6,166,629 | A | 12/2000 | Andreas |
| 6,166,698 | A | 12/2000 | Turnbull et al. |
| 6,167,755 | B1 | 1/2001 | Damson et al. |
| 6,172,600 | B1 | 1/2001 | Kakinami et al. |
| 6,172,601 | B1 | 1/2001 | Wada et al. |
| 6,175,300 | B1 | 1/2001 | Kendrick |
| 6,184,781 | B1 | 2/2001 | Ramakesavan |
| 6,185,492 | B1 | 2/2001 | Kagawa et al. |
| 6,191,704 | B1 | 2/2001 | Takenaga et al. |
| 6,200,010 | B1 | 3/2001 | Anders |
| 6,218,934 | B1 | 4/2001 | Regan |
| 6,222,447 | B1 | 4/2001 | Schofield et al. |
| 6,249,214 | B1 | 6/2001 | Kashiwazaki |
| 6,250,766 | B1 | 6/2001 | Strumolo et al. |
| 6,255,639 | B1 | 7/2001 | Stam et al. |
| 6,259,475 | B1 | 7/2001 | Ramachandran et al. |
| 6,265,968 | B1 | 7/2001 | Betzitza et al. |
| 6,268,803 | B1 | 7/2001 | Gunderson et al. |
| 6,269,308 | B1 | 7/2001 | Kodaka et al. |
| 6,281,632 | B1 | 8/2001 | Stam et al. |
| 6,281,804 | B1 | 8/2001 | Haller et al. |
| 6,289,332 | B2 | 9/2001 | Menig et al. |
| 6,300,879 | B1 | 10/2001 | Regan et al. |
| 6,304,173 | B2 | 10/2001 | Pala et al. |
| 6,317,057 | B1 | 11/2001 | Lee |
| 6,320,612 | B1 | 11/2001 | Young |
| 6,324,295 | B1 | 11/2001 | Avionique et al. |
| 6,329,925 | B1 | 12/2001 | Skiver et al. |
| 6,330,511 | B2 | 12/2001 | Ogura et al. |
| 6,335,680 | B1 | 1/2002 | Matsuoka |
| 6,344,805 | B1 | 2/2002 | Yasui et al. |
| 6,348,858 | B2 | 2/2002 | Weis et al. |
| 6,349,782 | B1 | 2/2002 | Sekiya et al. |
| 6,356,206 | B1 | 3/2002 | Takenaga et al. |
| 6,356,376 | B1 | 3/2002 | Tonar et al. |
| 6,357,883 | B1 | 3/2002 | Strumolo et al. |
| 6,363,326 | B1 | 3/2002 | Scully |
| 6,369,701 | B1 | 4/2002 | Yoshida et al. |
| 6,379,013 | B1 | 4/2002 | Bechtel et al. |
| 6,396,040 | B1 | 5/2002 | Hill |
| 6,396,397 | B1 | 5/2002 | Bos et al. |
| 6,403,942 | B1 | 6/2002 | Stam |
| 6,408,247 | B1 | 6/2002 | Ichikawa et al. |
| 6,412,959 | B1 | 7/2002 | Tseng |
| 6,415,230 | B1 | 7/2002 | Maruko et al. |
| 6,421,081 | B1 | 7/2002 | Markus |
| 6,424,272 | B1 | 7/2002 | Gutta et al. |
| 6,424,273 | B1 | 7/2002 | Gutta et al. |
| 6,424,892 | B1 | 7/2002 | Matsuoka |
| 6,428,172 | B1 | 8/2002 | Hutzel et al. |
| 6,433,680 | B1 | 8/2002 | Ho |
| 6,437,688 | B1 | 8/2002 | Kobayashi |
| 6,438,491 | B1 | 8/2002 | Farmer |
| 6,441,872 | B1 | 8/2002 | Ho |
| 6,442,465 | B2 | 8/2002 | Breed et al. |
| 6,443,602 | B1 | 9/2002 | Tanabe et al. |
| 6,447,128 | B1 | 9/2002 | Lang et al. |
| 6,452,533 | B1 | 9/2002 | Yamabuchi et al. |
| 6,463,369 | B2 | 10/2002 | Sadano et al. |
| 6,465,962 | B1 | 10/2002 | Fu et al. |
| 6,466,701 | B1 | 10/2002 | Ejiri et al. |
| 6,469,739 | B1 | 10/2002 | Bechtel et al. |
| 6,472,977 | B1 | 10/2002 | Pochmuller |
| 6,473,001 | B1 | 10/2002 | Blum |
| 6,476,731 | B1 | 11/2002 | Miki et al. |
| 6,476,855 | B1 | 11/2002 | Yamamoto |
| 6,483,429 | B1 | 11/2002 | Yasui et al. |
| 6,483,438 | B2 | 11/2002 | DeLine et al. |
| 6,487,500 | B2 | 11/2002 | Lemelson et al. |
| 6,491,416 | B1 | 12/2002 | Strazzanti |
| 6,498,620 | B2 | 12/2002 | Schofield et al. |
| 6,501,387 | B2 | 12/2002 | Skiver et al. |
| 6,507,779 | B2 | 1/2003 | Breed et al. |
| 6,515,581 | B1 | 2/2003 | Ho |
| 6,515,597 | B1 | 2/2003 | Wada et al. |
| 6,520,667 | B1 | 2/2003 | Mousseau |
| 6,522,969 | B2 | 2/2003 | Kannonji |
| 6,542,085 | B1 | 4/2003 | Yang |
| 6,542,182 | B1 | 4/2003 | Chutorash |
| 6,545,598 | B1 | 4/2003 | Jodon De Villeroche |
| 6,550,943 | B2 | 4/2003 | Strazzanti |
| 6,553,130 | B1 | 4/2003 | Lemelson et al. |
| 6,558,026 | B2 | 5/2003 | Strazzanti |
| 6,559,761 | B1 | 5/2003 | Miller et al. |
| 6,572,233 | B1 | 6/2003 | Northman et al. |
| 6,580,373 | B1 | 6/2003 | Ohashi |
| 6,581,007 | B2 | 6/2003 | Hasegawa et al. |
| 6,583,730 | B2 | 6/2003 | Lang et al. |
| 6,575,643 | B2 | 7/2003 | Takashashi |
| 6,587,573 | B1 | 7/2003 | Stam et al. |
| 6,591,192 | B2 | 7/2003 | Okamura et al. |
| 6,594,583 | B2 | 7/2003 | Ogura et al. |
| 6,594,614 | B2 | 7/2003 | Studt et al. |
| 6,611,202 | B2 | 8/2003 | Schofield et al. |
| 6,611,227 | B1 | 8/2003 | Nebiyeloul-Kifle |
| 6,611,610 | B1 | 8/2003 | Stam et al. |
| 6,611,759 | B2 | 8/2003 | Brosche |
| 6,614,387 | B1 | 9/2003 | Deadman |
| 6,616,764 | B2 | 9/2003 | Kramer et al. |

(56) References Cited

U.S. PATENT DOCUMENTS

| | | |
|---|---|---|
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarthy et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,772,057 B2 | 8/2004 | Breed et al. |
| 6,774,988 B2 | 8/2004 | Stam et al. |
| 6,846,098 B2 | 1/2005 | Bourdelais et al. |
| 6,847,487 B2 | 1/2005 | Burgner |
| 6,861,809 B2 | 3/2005 | Stam |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,946,978 B2 | 9/2005 | Schofield |
| 7,012,543 B2 | 3/2006 | DeLine et al. |
| 7,038,577 B2 | 5/2006 | Pawlicki et al. |
| 7,046,448 B2 | 5/2006 | Burgner |
| 7,175,291 B1 | 2/2007 | Li |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,292,208 B1 | 11/2007 | Park et al. |
| 7,311,428 B2 | 12/2007 | DeLine et al. |
| 7,321,112 B2 | 1/2008 | Stam et al. |
| 7,360,932 B2 | 4/2008 | Uken et al. |
| 7,417,221 B2 | 8/2008 | Creswick et al. |
| 7,446,650 B2 | 11/2008 | Scholfield et al. |
| 7,467,883 B2 | 12/2008 | DeLine et al. |
| 7,468,651 B2 | 12/2008 | DeLine et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,653,215 B2 | 1/2010 | Stam |
| 7,658,521 B2 | 2/2010 | DeLine et al. |
| 7,683,326 B2 | 3/2010 | Stam et al. |
| 7,711,479 B2 | 5/2010 | Taylor et al. |
| 7,719,408 B2 | 5/2010 | DeWard et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | DeLine et al. |
| 7,972,045 B2 | 7/2011 | Schofield |
| 7,994,471 B2 | 8/2011 | Heslin et al. |
| 8,031,225 B2 | 10/2011 | Watanabe et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,120,652 B2 | 2/2012 | Bechtel et al. |
| 8,142,059 B2 | 3/2012 | Higgins-Luthman et al. |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,282,226 B2 | 10/2012 | Blank et al. |
| 8,325,028 B2 | 12/2012 | Schofield et al. |
| 8,482,683 B2 | 7/2013 | Hwang et al. |
| 9,713,985 B2 | 7/2017 | Konuki |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0154379 A1 | 10/2002 | Tonar et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |

(56) References Cited

U.S. PATENT DOCUMENTS

| | | |
|---|---|---|
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2006/0262569 A1 | 11/2006 | Kim et al. |
| 2006/0287826 A1 | 12/2006 | Shimizu et al. |
| 2007/0171037 A1 | 7/2007 | Schofield et al. |
| 2008/0013153 A1 | 1/2008 | McCabe et al. |
| 2008/0068520 A1 | 3/2008 | Minikey, Jr. et al. |
| 2008/0192132 A1 | 8/2008 | Bechtel et al. |
| 2008/0247192 A1 | 10/2008 | Hoshi et al. |
| 2008/0294315 A1 | 11/2008 | Breed |
| 2009/0015736 A1 | 1/2009 | Weller et al. |
| 2009/0141516 A1 | 6/2009 | Wu et al. |
| 2010/0201896 A1 | 8/2010 | Ostreko et al. |
| 2013/0028473 A1 | 1/2013 | Hilldore et al. |
| 2013/0229523 A1* | 9/2013 | Higgins-Luthman ................ B60W 30/16 348/148 |
| 2013/0279014 A1 | 10/2013 | Fish, Jr. et al. |
| 2014/0347488 A1 | 11/2014 | Tazaki et al. |
| 2015/0094885 A1* | 4/2015 | Dargy ................ B61L 23/048 701/19 |
| 2015/0251602 A1* | 9/2015 | Baur ................ B60R 1/04 348/148 |
| 2017/0166131 A1* | 6/2017 | Oba ................ H04N 5/268 |
| 2019/0061624 A1* | 2/2019 | Katsumata ................ H04N 5/265 |
| 2019/0275947 A1 | 9/2019 | Tazaki et al. |

FOREIGN PATENT DOCUMENTS

| | | |
|---|---|---|
| EP | 0899157 B1 | 10/2004 |
| GB | 2338363 | 12/1999 |
| JP | 1178693 | 3/1999 |
| JP | 2005148119 | 6/2005 |
| JP | 2005327600 | 11/2005 |
| JP | 2008139819 A | 6/2008 |
| WO | 9621581 | 7/1996 |
| WO | 2007103573 A2 | 9/2007 |
| WO | 2010090964 A1 | 8/2010 |
| WO | 2016178190 A1 | 11/2016 |
| WO | 2018020751 A1 | 2/2018 |

OTHER PUBLICATIONS

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications," Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society for Information Display, Detroit Center, Santa Ana, CA.

\* cited by examiner

FULL DISPLAY MIRROR WITH ON-DEMAND SPOTTER VIEW

CROSS-REFERENCE TO RELATED APPLICATION

This application is a continuation application of U.S. patent application Ser. No. 15/855,028, filed on Dec. 27, 2017, entitled "FULL DISPLAY MIRROR WITH ON DEMAND SPOTTER VIEW," which claims priority to and the benefit under 35 U.S.C. § 119(e) of U.S. Provisional Patent Application No. 62/440,918, filed on Dec. 30, 2016, entitled "FULL DISPLAY MIRROR WITH ON DEMAND SPOTTER VIEW," the entire disclosure of which is hereby incorporated herein by reference.

BACKGROUND OF THE INVENTION

The present invention generally relates to processing of video images streamed to a display, and more specifically to processing of streamed video images of scenes exterior to a vehicle. In some embodiments the present invention pertains even more specifically to processing of video images obtained from a rearward facing camera in a vehicle that are streamed to a display serving as a replacement for, or a supplement to, a rearview mirror.

SUMMARY OF THE INVENTION

According to one aspect of the present invention, a rearview display system is provided for a vehicle equipped with: a rear camera for generating a rearward video stream of a scene to a rear of the vehicle, a right-side camera for generating a right-side video stream of a scene to a right side of the vehicle, and a left-side camera for generating a left-side video stream of a scene to a left side of the vehicle. The rearview display system comprises: a processing circuit for receiving the rearward video stream, the right-side video stream, the left-side video stream, and an active spotter signal, wherein the processing circuit generates a composite video stream in response to the active spotter signal, the processing circuit forming the composite video stream from: (a) the rearward video stream and the right-side video stream, (b) the rearward video stream and the left-side video stream, and (c) at least the rearward video stream; and a display for displaying the composite video stream. When the composite video stream is formed from the rearward video stream and the right-side video stream, the rearward video stream extends across the whole composite video stream with the exception of an upper right corner of the composite video stream where the right-side video stream is superimposed over the rearward video stream. When the composite video stream is formed from the rearward video stream and the left-side video stream, the rearward video stream extends across the whole composite video stream with the exception of an upper left corner of the composite video stream where the left-side video stream is superimposed over the rearward video stream.

According to another aspect of the present invention, a rearview display system is provided for a vehicle equipped with: a rear camera for generating a rearward video stream of a scene to a rear of the vehicle, a right-side camera for generating a right-side video stream of a scene to a right side of the vehicle, and a left-side camera for generating a left-side video stream of a scene to a left side of the vehicle. The rearview display system comprises: a processing circuit for receiving the rearward video stream, the right-side video stream, and the left-side video stream, wherein the processing circuit generates a composite video stream, the processing circuit forming the composite video stream from one of: (a) the rearward video stream and the right-side video stream, (b) the rearward video stream and the left-side video stream, and (c) at least the rearward video stream; and a display for displaying the composite video stream. When the composite video stream is formed from the rearward video stream and the right-side video stream, the rearward video stream extends across the whole composite video stream with the exception of an upper right corner of the composite video stream where the right-side video stream is superimposed over the rearward video stream. When the composite video stream is formed from the rearward video stream and the left-side video stream, the rearward video stream extends across the whole composite video stream with the exception of an upper left corner of the composite video stream where the left-side video stream is superimposed over the rearward video stream.

According to another aspect of the present invention, a method is provided for displaying rearward images on a rearview display for a vehicle equipped with: a rear camera for generating a rearward video stream of a scene to a rear of the vehicle, a right-side camera for generating a right-side video stream of a scene to a right side of the vehicle, and a left-side camera for generating a left-side video stream of a scene to a left side of the vehicle. The method comprises: generating a composite video stream in response to an active spotter signal from: (a) the rearward video stream and the right-side video stream, (b) the rearward video stream and the left-side video stream, and (c) at least the rearward video stream; and displaying the composite video stream. When the composite video stream is formed from the rearward video stream and the right-side video stream, the rearward video stream extends across the whole composite video stream with the exception of an upper right corner of the composite video stream where the right-side video stream is superimposed over the rearward video stream. When the composite video stream is formed from the rearward video stream and the left-side video stream, the rearward video stream extends across the whole composite video stream with the exception of an upper left corner of the composite video stream where the left-side video stream is superimposed over the rearward video stream.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
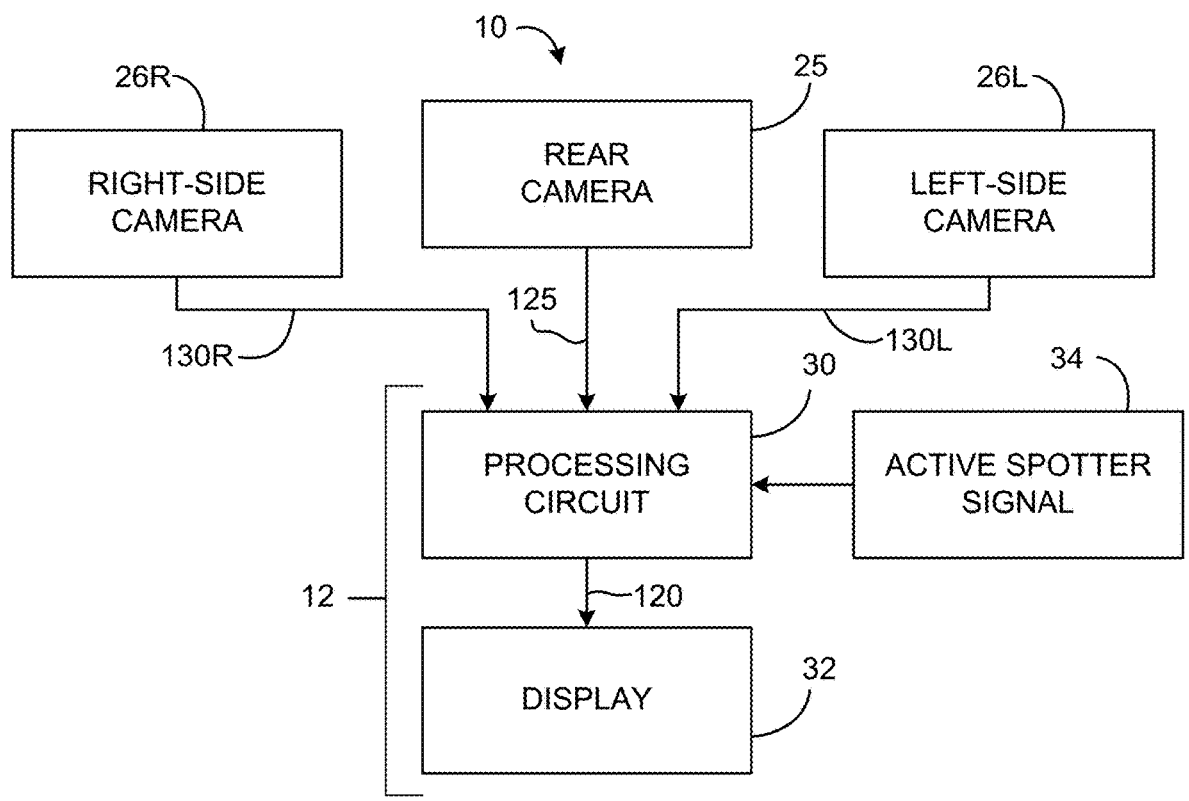
FIG. 1 is a block diagram of an imaging system according to an embodiment of the invention.

FIG. 1 shows an imaging system 10 according to a first embodiment. As shown, imaging system 10 includes a rear camera 25 for generating a rearward video stream 125 of a scene to a rear of the vehicle, a right-side camera 26R for generating a right-side video stream 130R of a scene to a right side of the vehicle, a left-side camera 26L for generating a left-side video stream 130L of a scene to a left side of the vehicle, and a display system 12, which includes a processing circuit 30 that receives the streamed video images and generates a composite video stream 120 (as discussed in detail below), and a display 32 that displays the composite video stream 120. The imaging system 10 may be provided in a vehicle that is equipped with a source of an active spotter signal 34 such as a turn signal generating a right turn signal and a left turn signal. The processing circuit 30 may be configured to receive the active spotter signals.

Figure 2:
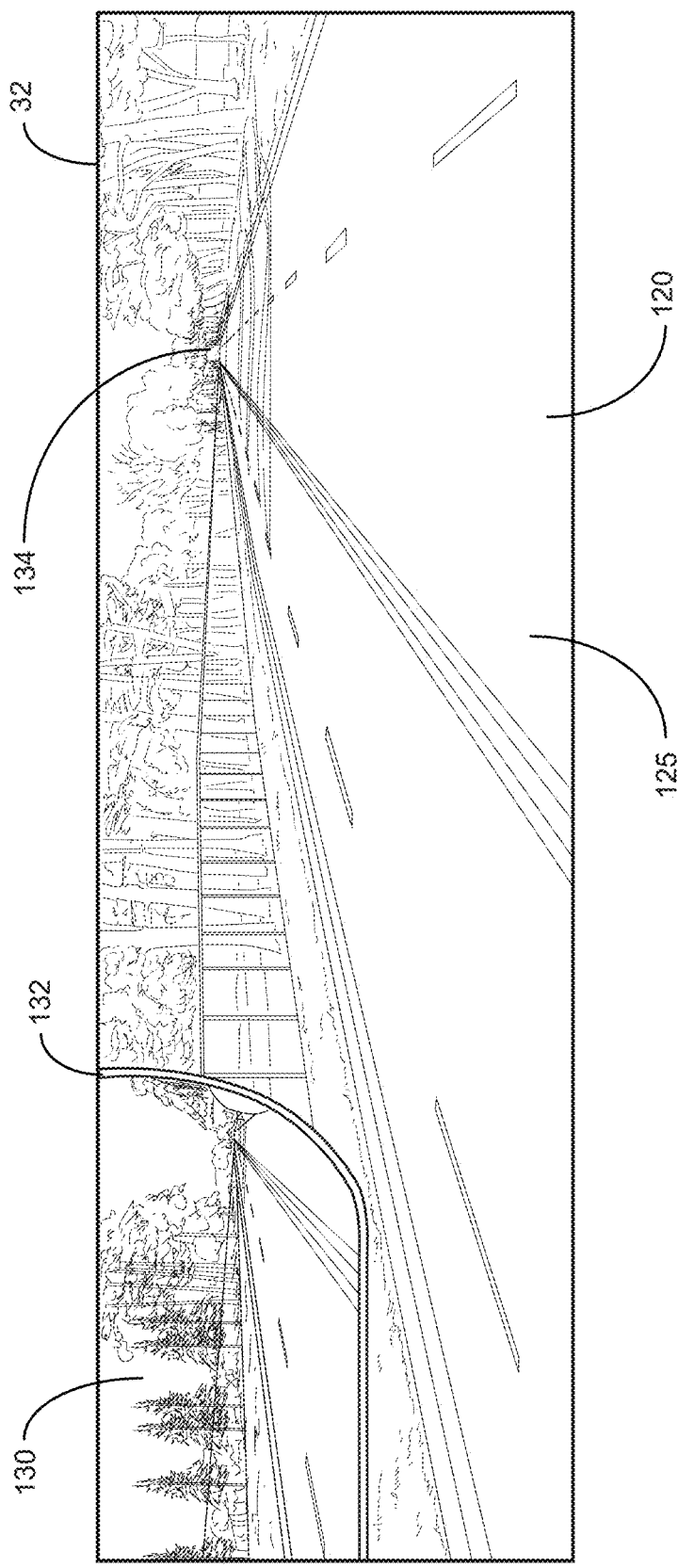
FIG. 2 is a pictorial representation of an example of a composite video stream that may be generated by the processing circuit shown in FIG. 1.

The processing circuit 30 may be configured to show the composite image 120 as depicted in FIG. 2 when an active spotter signal is received that indicates that the left spotter should be shown, the composite image may take on this appearance either in response to other triggering mechanisms or in response to a user input or user default selection. In other words, the spotter view corresponding to the left video stream 130L in FIG. 2 may be generated and displayed on-demand. One such other triggering method could be active spotter signals from left and right blind spot detectors that detect when a vehicle is present in one of the left or right blind spots. If a vehicle is present in the left blind spot, the composite display could include a spotter view of the left blind spot. Likewise, if a vehicle is present in the right blind spot, the composite display could include a spotter view of the right blind spot.

The active spotter signal may also be a rear cross path signal, an object detection signal, and/or a speed signal. Thus, the active spotter signal is selected from at least one of a turn signal, a side blind zone signal, a rear cross path signal, an object detection signal, and a speed signal.

As described further below, the processing circuit 30 is configured to form the composite video stream 120 from: (a) the rearward video stream 125 and the right-side video stream 130R, (b) the rearward video stream 125 and the left-side video stream 130L, and (c) at least the rearward video stream 125. The composite video stream 120 may include video streams that are stitched together or video streams that are separately displayed in a side-by-side or overlapping fashion.

As shown in FIG. 2, when the composite video stream 120 is formed from the rearward video stream 125 and the left-side video stream 130L, the rearward video stream 125 extends across the whole composite video stream 120 with the exception of an upper left corner of the composite video stream 120 where the left-side video stream 130L is superimposed over the rearward video stream 125. Similarly, when the composite video stream 120 is formed from the rearward video stream 125 and the right-side video stream 130R, the rearward video stream 125 extends across the whole composite video stream 120 with the exception of an upper right corner of the composite video stream 120 where the right-side video stream 130R is superimposed over the rearward video stream 125. The composite video stream 120 may thus selectively provide an appearance similar to a spotter mirror typically found on an outside mirror assembly so as to provide a better view of blind spots to the sides of the vehicle.

The spotter view may be processed to appear as though the video stream is from a wide angle view or fish-eye view camera, or the right-side camera 26R and left-side camera 26L may be equipped with a wide angle view or fish-eye view lens.

As shown in FIG. 2, a demarcation line 132 may be provided in the composite video stream 120 to demark the boundaries of the two video streams 130L and 125.

To further ensure that the spotter view does not significantly obstruct the rearward video stream 125, the spotter view is restricted to an upper corner of the composite video stream 120. In this case, the upper corner in which the spotter view is located may be confined above a horizontal center line of the rearward video stream and has a width less than a third of the width of the rearward video stream 125.

To further ensure that the view of the rearward scene is not obstructed, a convergence point 134 of the rearward video stream 125 may be moved from the center of the composite video stream 120 towards a side opposite the spotter view as shown in FIG. 2. This tends to shift the field of view to the direction in which a turn is being signaled while enabling the spotter view to be placed in an area of the rearward scene where there would likely not be a vehicle present.

Figure 3:
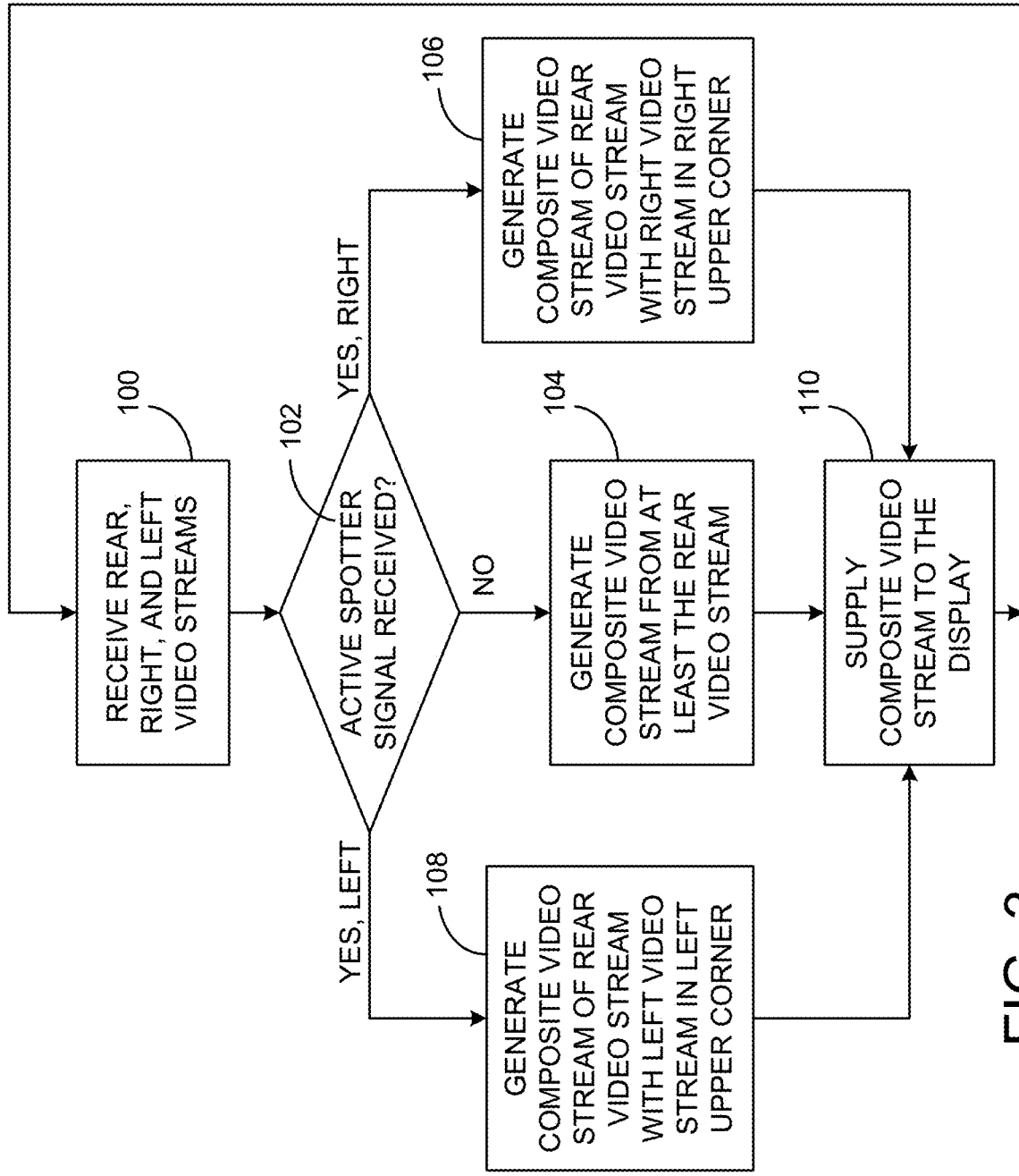
FIG. 3 is a flow chart showing the method steps performed by the processing circuit shown in FIG. 1.

FIG. 3 is a flowchart showing the method steps performed by the processing circuit 30. In step 100, the processing circuit 30 receives the rearward video stream 125, the right-side video stream 130R, and left-side video stream 130L from rear camera 25, right-side camera 26R, and left-side camera 26L, respectively. Then, in step 102, the processing circuit 30 determines if the active spotter signal 34 is received and whether the active spotter signal indicates that the right or left spotter should be shown. For example, if the active spotter signal is a turn signal, the processing circuit 30 determines whether the left or right turn signal is activated. If the active spotter signal is not received (or if the active spotter signal does not indicate that either the right or left spotter should be shown), the processing circuit 30 generates the composite video image 120 from at least the rearward video stream 125 (step 104). The processing circuit 30 then supplies this composite image 120 to the display 32 for display thereon (step 110). Steps 100, 102, 104, and 110 are repeated until such time that an active spotter signal is received.

If the processing circuit 30 determines in step 102 that an active spotter signal is received and that the active spotter signal indicates that the right spotter should be shown, the processing circuit 30 generates the composite video stream 120 from the rearward video stream 125 and the right-side video stream 130R where the rearward video stream 125 extends across the whole composite video stream 120 with the exception of an upper right corner of the composite video stream 120 where the right-side video stream 130R is superimposed over the rearward video stream 125 (step 106). The processing circuit 30 then supplies this composite image 120 to the display 32 for display thereon (step 110). Steps 100, 102, 106, and 110 are repeated until such time that the active spotter signal is no longer received or that the left spotter should be shown.

If the processing circuit 30 determines in step 102 that an active spotter signal is received and that the active spotter signal indicates that the left spotter should be shown, the processing circuit 30 generates the composite video stream 120 from the rearward video stream 125 and the left-side video stream 130L where the rearward video stream 125 extends across the whole composite video stream 120 with the exception of an upper left corner of the composite video stream 120 where the left-side video stream 130L is superimposed over the rearward video stream 125 (step 108). The processing circuit 30 then supplies this composite image 120 to the display 32 for display thereon (step 110). Steps 100, 102, 108, and 110 are repeated until such time that the active spotter signal is no longer received or that the right spotter should be shown.

The processing circuit 30 may form the composite video stream 120 from the rearward video stream 125, the right-side video stream 130R, and the left-side video stream 130L when no active spotter signal is received or if one is received that does not indicate that the right or left spotter should be shown. In this case, the composite video stream 120 may be formed by seamlessly stitching the video streams together to appear as one contiguous video stream representing a field of view that is larger than the field of view represented by any one of the separate video streams. This same stitched composite video stream may be used to generate the composite video stream when an active spotter signal is received such that the right-side video stream 130R or the left-side video stream 130L is superimposed thereon.

Figure 4A:
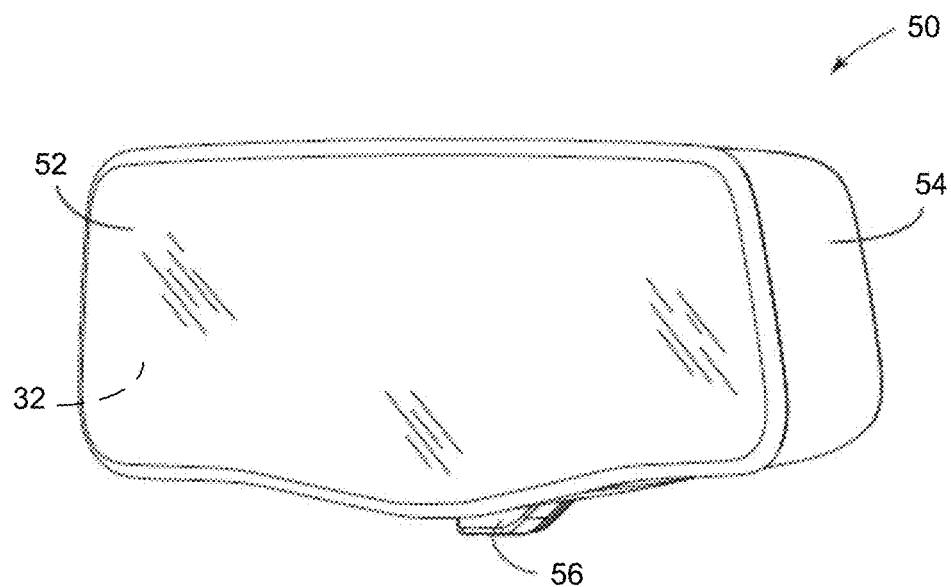
FIG. 4A is a front and side perspective view of a rearview assembly incorporating the imaging system of FIG. 1.
Figure 4B:
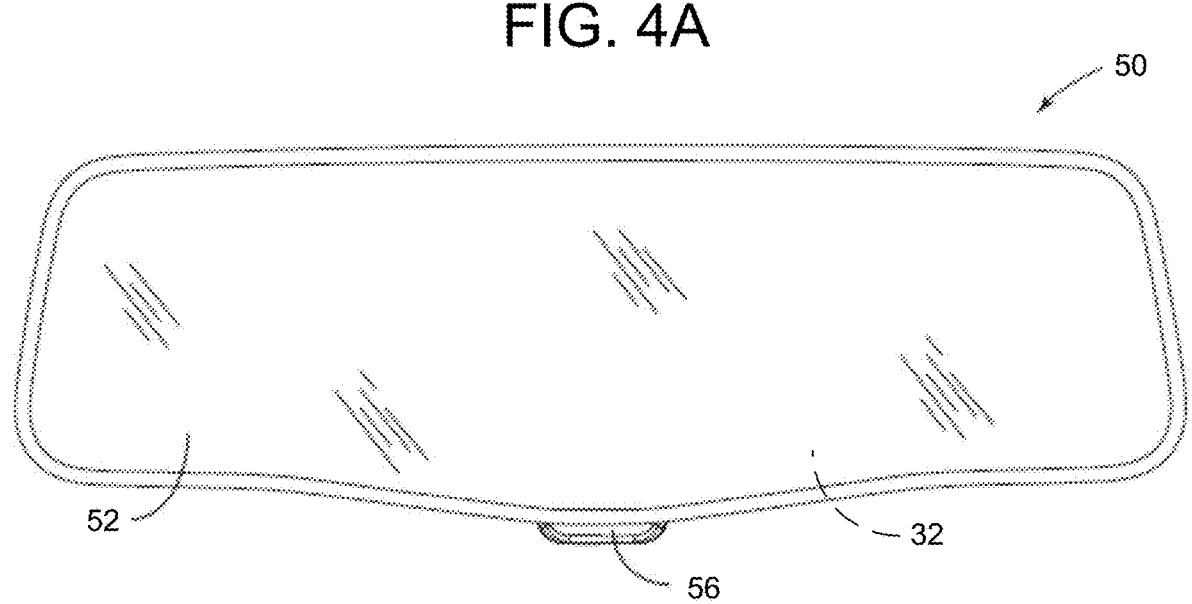
FIG. 4B is a front elevational view of the rearview assembly shown in FIG. 4A.

FIG. 4A is a front and side perspective view of a rearview assembly 50 incorporating the imaging system 10 of FIG. 1, and FIG. 4B is a front elevational view of the rearview assembly 50. The rearview assembly 50 includes a housing 54 and a transparent or semi-transparent element 52 extending across an opening in the housing 54. The display 32 is provided behind the transparent or semi-transparent element 52 so as to project the displayed composite image therethrough when the display 32 is active. The display 32 may be activated in response to a toggle switch 56.

The transparent or semi-transparent element 52 may be a partially reflective, partially transmissive mirror element or a switchable reflective element. Examples of a switchable reflective element are disclosed in commonly-assigned U.S. Pat. Nos. 9,254,789, 9,637,054, and 9,834,146, the entire disclosures of which are hereby incorporated herein by reference. Examples of partially reflective, partially transmissive mirror elements positioned in front of a display are disclosed in in commonly-assigned US 2015/0266427 A1, the entire disclosure of which is incorporated herein by reference.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A rearview display system for a vehicle equipped with: a rear camera for generating a rearward video stream of a scene to a rear of the vehicle, a right-side camera for generating a right-side video stream of a scene to a right side of the vehicle, and a left-side camera for generating a left-side video stream of a scene to a left side of the vehicle, the rearview display system comprising:
   a housing configured for attachment to the vehicle;
   a semi-transparent element extending across an opening in the housing, the semi-transparent element is a partially reflective, partially transmissive mirror element;
   a processing circuit for receiving the rearward video stream, the right-side video stream, the left-side video stream, and an active spotter signal, wherein the active spotter signal is selected from at least one of a turn signal, a side blind zone signal, a rear cross path signal, an object detection signal, and a speed signal, wherein the processing circuit generates a composite video stream in response to the active spotter signal, the processing circuit forming the composite video stream from: (a) the rearward video stream and the right-side video stream, (b) the rearward video stream and the left-side video stream, or (c) at least the rearward video stream;
   a display positioned in the housing behind the semi-transparent element so as to project the composite video stream through the semi-transparent element when the display is active; and
   a toggle switch on the housing for activating the display,
   wherein, when the composite video stream is formed from the rearward video stream and the right-side video stream, the rearward video stream extends across the whole composite video stream with the exception of an upper right corner of the composite video stream where the right-side video stream is superimposed over the rearward video stream such that the upper right corner of the rearward video stream is covered by the right-side video stream above a horizontal center line of the rearward video stream, wherein the right-side video stream has a width less than a third of the width of the rearward video stream, wherein a convergence point of the rearward video stream is moved from a center of the composite video stream towards a left side of the composite video stream,
   wherein, when the composite video stream is formed from the rearward video stream and the left-side video stream, the rearward video stream extends across the whole composite video stream with the exception of an upper left corner of the composite video stream where the left-side video stream is superimposed over the rearward video stream such that the upper left corner of the rearward video stream is covered by the left-side video stream above the horizontal center line of the rearward video stream, wherein the left-side video stream has a width less than a third of the width of the rearward video stream, wherein a convergence point of the rearward video stream is moved from the center of the composite video stream towards a right side of the composite video stream,
   wherein, when the active spotter signal is not received, the processing circuit forms a second composite video stream from the rearward video stream, the right-side video stream, and the left-side video stream by seamlessly stitching the video streams together to appear as one contiguous video stream, and
   wherein a demarcation line is provided in the composite video stream to demark boundaries of the video streams.

2. The rearview display system of claim 1, wherein the active spotter signal is received from a turn signal of the vehicle and that includes a right turn signal and a left turn signal, wherein the processing circuit receives the right turn signal and the left turn signal.

3. The rearview display system of claim 2, wherein the processing circuit forms the composite video stream from: (a) the rearward video stream and the right-side video stream in response to the right turn signal, (b) the rearward video stream and the left-side video stream in response to the left turn signal, or (c) the rearward video stream, the right-side video stream, and the left-side video stream when neither the right turn signal nor the left turn signal is received.

4. The rearview display system of claim 1, wherein the active spotter signal is received from left and right blind spot detectors of the vehicle that detect when a vehicle is present in one of a left blind spot or a right blind spot and the active spotter signal includes a right blind zone signal and a left blind zone signal, and wherein the processing circuit receives the right blind zone signal and the left blind zone signal.

5. The rearview display system of claim 4, wherein the processing circuit forms the composite video stream from: (a) the rearward video stream and the right-side video stream in response to the right blind zone signal, (b) the rearward video stream and the left-side video stream in response to the left blind zone signal, or (c) the rearward video stream, the right-side video stream, and the left-side video stream when neither the right blind zone signal nor the left blind zone signal is received.

6. A rearview display system for a vehicle equipped with: a rear camera for generating a rearward video stream of a scene to a rear of the vehicle, a right-side camera for generating a right-side video stream of a scene to a right side of the vehicle, and a left-side camera for generating a left-side video stream of a scene to a left side of the vehicle, the rearview display system comprising:
  a housing configured for attachment to the vehicle;
  a semi-transparent element extending across an opening in the housing, the semi-transparent element is a partially reflective, partially transmissive mirror element;
  a processing circuit for receiving the rearward video stream, the right-side video stream, and the left-side video stream, wherein the processing circuit generates a composite video stream, the processing circuit forming the composite video stream from one of: (a) the rearward video stream and the right-side video stream, (b) the rearward video stream and the left-side video stream, or (c) at least the rearward video stream;
  a display positioned in the housing behind the semi-transparent element so as to project the composite video stream through the semi-transparent element when the display is active; and
  a toggle switch on the housing for activating the display,
  wherein, when the composite video stream is formed from the rearward video stream and the right-side video stream, the rearward video stream extends across the whole composite video stream with the exception of an upper right corner of the composite video stream where the right-side video stream is superimposed over the rearward video stream above a horizontal center line of the rearward video stream, wherein the right-side video stream has a width less than a third of the width of the rearward video stream, wherein a convergence point of the rearward video stream is moved from a center of the composite video stream towards a left side of the composite video stream, and
  wherein, when the composite video stream is formed from the rearward video stream and the left-side video stream, the rearward video stream extends across the whole composite video stream with the exception of an upper left corner of the composite video stream where the left-side video stream is superimposed over the rearward video stream above the horizontal center line of the rearward video stream, wherein the left-side video stream has a width less than a third of the width of the rearward video stream, wherein a convergence point of the rearward video stream is moved from a center of the composite video stream towards a right side of the composite video stream,
  wherein the processing circuit generates the composite video stream from selected combinations of the rearward video stream, the right-side video stream, and the left-side video stream in response to an active spotter signal, and
  wherein, when the active spotter signal is not received, the processing circuit forms a second composite video stream from the rearward video stream, the right-side video stream, and the left-side video stream by seamlessly stitching the video streams together to appear as one contiguous video stream.

7. The rearview display system of claim 6, wherein the active spotter signal is selected from at least one of a turn signal, a side blind zone signal, a rear cross path signal, an object detection signal, and a speed signal.

8. The rearview display system of claim 6, wherein the active spotter signal is received from a turn signal of the vehicle and that includes a right turn signal and a left turn signal, wherein the processing circuit receives the right turn signal and the left turn signal.

9. The rearview display system of claim 8, wherein the processing circuit forms the composite video stream from: (a) the rearward video stream and the right-side video stream in response to the right turn signal, (b) the rearward video stream and the left-side video stream in response to the left turn signal, or (c) the rearward video stream, the right-side video stream, and the left-side video stream when neither the right turn signal nor the left turn signal is received.

10. The rearview display system of claim 6, wherein the active spotter signal is received from left and right blind spot detectors of the vehicle that detect when a vehicle is present in one of a left blind spot or a right blind spot and the active spotter signal includes a right blind zone signal and a left blind zone signal, wherein the processing circuit receives the right blind zone signal and the left blind zone signal.

11. The rearview display system of claim 10, wherein the processing circuit forms the composite video stream from: (a) the rearward video stream and the right-side video stream in response to the right blind zone signal, (b) the rearward video stream and the left-side video stream in response to the left blind zone signal, or (c) the rearward video stream, the right-side video stream, and the left-side video stream when neither the right blind zone signal nor the left blind zone signal is received.

12. The rearview display system of claim 6, wherein the processing circuit generates the composite video stream from selected combinations of the rearward video stream, the right-side video stream, and the left-side video stream in response to user input.

13. A method of displaying rearward images on a rearview display for a vehicle equipped with: a rear camera for generating a rearward video stream of a scene to a rear of the vehicle, a right-side camera for generating a right-side video stream of a scene to a right side of the vehicle, and a left-side camera for generating a left-side video stream of a scene to a left side of the vehicle, the method comprising:
  generating a composite video stream in response to an active spotter signal from: (a) the rearward video stream and the right-side video stream, (b) the rearward video stream and the left-side video stream, or (c) at least the rearward video stream; and
  displaying the composite video stream,
  wherein, when the composite video stream is formed from the rearward video stream and the right-side video stream, the rearward video stream extends across the whole composite video stream with the exception of an upper right corner of the composite video stream where the right-side video stream is superimposed over the rearward video stream above a horizontal center line of the rearward video stream, wherein the right-side video stream has a width less than a third of the width of the rearward video stream, wherein a convergence point of the rearward video stream is moved from a center of the composite video stream towards a left side of the composite video stream, and wherein, when the composite video stream is formed from the rearward video stream and the left-side video stream, the rearward video stream extends across the whole composite video stream with the exception of an upper left corner of the composite video stream where the left-side video stream is superimposed over the rearward video stream above a horizontal center line of the rearward video stream, wherein the left-side video stream has a width less than a third of the width of the rearward video stream, wherein a convergence point of the rearward video stream is moved from a center of the composite video stream towards a right side of the composite video stream, and wherein, when the active spotter signal is not received, a second composite video stream is formed from the rearward video stream, the right-side video stream, and the left-side video stream by seamlessly stitching the video streams together to appear as one contiguous video stream.

14. The method of claim 13, wherein the active spotter signal is selected from at least one of a turn signal, a side blind zone signal, a rear cross path signal, an object detection signal, and a speed signal.

15. The method of claim 13, wherein the active spotter signal is received from a turn signal of the vehicle and that includes a right turn signal and a left turn signal.

16. The method of claim 15, wherein the composite video stream is formed from: (a) the rearward video stream and the right-side video stream in response to the right turn signal, (b) the rearward video stream and the left-side video stream in response to the left turn signal, or (c) the rearward video stream, the right-side video stream, and the left-side video stream when neither the right turn signal nor the left turn signal is received.

17. The method of claim 13, wherein the active spotter signal is received from left and right blind spot detectors of the vehicle that detect when a vehicle is present in one of a left blind spot or a right blind spot and the active spotter signal includes a right blind zone signal and a left blind zone signal.

18. The method of claim 17, wherein the composite video stream is formed from: (a) the rearward video stream and the right-side video stream in response to the right blind zone signal, (b) the rearward video stream and the left-side video stream in response to the left blind zone signal, or (c) the rearward video stream, the right-side video stream, and the left-side video stream when neither the right blind zone signal nor the left blind zone signal is received.

* * * * *